United States Patent [19]

Tsuzuki et al.

[11] Patent Number: 4,827,473
[45] Date of Patent: May 2, 1989

[54] PACKET SWITCHING SYSTEM

[75] Inventors: Kazuo Tsuzuki; Yoshinori Yoshida; Toshio Ishizuka; Mitsugu Anezaki, all of Tokyo, Japan

[73] Assignee: NEC Corporation, Japan

[21] Appl. No.: 66,766

[22] PCT Filed: Sep. 29, 1986

[86] PCT No.: PCT/JP86/00498

§ 371 Date: May 29, 1987

§ 102(e) Date: May 29, 1987

[87] PCT Pub. No.: WO87/02207

PCT Pub. Date: Apr. 9, 1987

[30] Foreign Application Priority Data

Sep. 30, 1985 [JP] Japan .................................. 60-218372
Oct. 17, 1985 [JP] Japan .................................. 60-232684

[51] Int. Cl.⁴ .............................................. H04J 3/12
[52] U.S. Cl. .......................................... 370/60; 370/94
[58] Field of Search ...................... 370/58, 60, 94, 85

[56] References Cited

U.S. PATENT DOCUMENTS

| 3,105,878 | 10/1963 | Frankel et al. | 370/66 |
| 4,354,263 | 10/1982 | Bordry et al. | 370/94 |
| 4,488,288 | 11/1984 | Turner | 370/60 |
| 4,499,576 | 2/1985 | Fraser | 370/94 |
| 4,535,448 | 8/1985 | Baxter et al. | 370/94 |
| 4,580,261 | 4/1986 | Pelotte | 370/80 |
| 4,707,828 | 11/1987 | Yamada | 370/94 |

FOREIGN PATENT DOCUMENTS

| 3109802 | 9/1982 | Fed. Rep. of Germany | 370/58 |
| 221425 | 12/1983 | Japan | 370/94 |

OTHER PUBLICATIONS

Rothauser et al., "Meshed-Star Networks for Local Communication Systems", pp. 25-40, Aug. 29, 1980.
Restorick et al., "A Multi-Microprocessor Design for Use in a Packet Switched Network", pp. 811-816, Sep. 10, 1982.
Yashiro et al., "A Distributed High-Throughput Packet Switching System", pp. 27.1.1-27.1.5, Jun. 26, 1985.
McDermid et al., "Design and Use of Comflex-a Hardware-Controlled Packet Switch", IEEE Proceedings, vol. 127, No. 6, 11/1980, pp. 233-240.

Primary Examiner—A. D. Pellinen
Assistant Examiner—Geoffrey S. Evans
Attorney, Agent, or Firm—Leydig, Voit & Mayer

[57] ABSTRACT

A packet switching system for achieving high-speed packet switching on data lines having the X.25 protocol of the C.C.I.T.T. It includes a plurality of data line apparatuses (DLC: 10, 11, and 1N), a call connection control information transfer bus commonly connected to the plurality of data line apparatuses (CB: 2), a specialized data transfer bus for data packets (DB: 4), a packet buffer state information transfer bus for transmitting and receiving call state information (SB: 6), and a call connection controlling processor connected to the call connection control information transfer bus (CP: 3). Each of the data line apparatuses has a receive packet storing circuit (DTRQ: 102) provided with a receive packet buffer of the first-in random out (FIRO) memory, and a transmit packet storing circuit (DTSQ: 105) provided with a transmit packet buffer of the FIRO memory.

3 Claims, 10 Drawing Sheets

PACKET SWITCHING SYSTEM

DESCRIPTION

1. Technical Field

The present invention relates to a packet switching system and, more particularly, to a packet switching system for achieving high-speed and large-capacity packet switching on communications lines conforming to the recommendation X.25 of the International Telegraph and Telephone Consultative Committee (C.C.I.T.T.).

2. Background Art

A packet switching system, the importance of which as a data communications system is generally recognized, is particularly effective for short-burst traffic. As packet switching has a concept of logical multiplexing and uses a line only when data is actually present, it contributes to efficient use of the line. Since packet switching further has error recovery and flow control functions, it permits reliable transmission and reception of data as well as communication between terminals having different speeds.

Despite these many advantages, a packet switching system commercially available at present has the disadvantages that it can handle a line speed of at most 64 Kbps, and that the processing capacity of a whole system is only a few thousand packets per second (pps), or tens of pps per line. Consequently, no commercially available packet switching systems can handle high-speed short-burst traffic of 1 to 10 megabits per second (Mbps) used by local area networks (LAN's), resulting in inability to expand burst characteristics in a given local area.

Obviation of these disadvantages requires a packet switching system capable of handling line speed in the order of megabits per second. Methods for accelerating packet switching have been proposed in U.S. Pats. Nos. 4,491,945 and 4,494,230. These proposed methods include simplifying the protocol used in packet switching, eliminating the flow control and error recovery functions from within the packet switching system and having these functions performed between terminals. These methods however, involve the following problems, and therefore cannot be used for a packet switching system for commerical data communications.

Thus, since plural combinations of packet terminals simultaneously communicate via plural logical channels, the error recovery functions have to simultaneously cover the plural combinations of packet terminals, and those functions, including CRC (cyclic redundancy check) and request-for-retransmission functions performed between the terminals, have to be independent for each logical channel. As a result, the whole system becomes complicated, resulting in higher cost and lower speed of the terminals.

On the other hand, the protocol prescribed by the C.C.I.T.T. recommendation X.25 leaves such error recovery functions to the X.25 Level 2 (Data Link Procedure). This ensures the reliability of link-by-link data transfers between terminals and the switching system, so that the terminals need not be conscious of logical channels in the performance of the CRC or request-for-retransmission functions and their loads are less than a terminal-by-terminal protocol would impose. This consideration points to a problem inherent in the assignment of error recovery functions to the terminals from the viewpoint of alleviating the protocol loads on the terminals.

A packet terminal on the transmitting side, after transmitting a data frame (packet), has to keep that transmitted data frame until a signal of "acknowledgment" is received from the packet switching system or the other terminal in preparation for a possible request for retransmission due to an error. Meanwhile, the number of packet buffers on the receiving side limits the number of outstanding frames of packets (denominated in k) that can be transmitted before a signal of "acknowledgment" arrives. Now, among the values of k, line delay d (sec), data frame length l (bits), data transfer velocity v (bps) and line utilization frequency $\xi$, there is a fundamental relationship of $\xi=(1/2d)\cdot(k/v)$. The line delay, which is about 10 ms (milliseconds) on a terrestrial line, is 250 ms or so on a satellite line. Then, when a flow control is effected between terminals, it is the switching system rather than the terminals that decides whether to use the terrestrial line or the satellite line for communication between them. Whether the value of d is in the order of 10 ms or 250 ms varies from call to call or from logical channel to logical channel. Therefore, in order to keep the value of $\xi$ sufficiently high irrespective of whether the value of d is 10 ms or 250 ms, the k value of the terminal has to be determined assuming a d value of about 250 ms. Thus, the number of packet buffers has to be 25 times as many as in the case where $\xi$ is assumed to be 10 ms or so. This would result in higher cost and greater complexity of the terminals. From this point of view as well, it is undesirable, in designing a packet switching system, to suppose that flow control be performed between the terminals.

As the foregoing description suggests, what is required is a packet switching system which has link-by-link flow control and error recovery functions and which is capable of handling far higher-speed lines than by the prior art. Thus, it should be a high-speed packet switching system having the conventional C.C.I.T.T. X.25 protocol and able to handle high-speed lines of up to 1.5 Mbps or so.

DISCLOSURE OF THE INVENTION

The present invention has the following features to realize a packet switching system having the X.25 protocol and satisfying the foregoing requirement.

First the invention is characterized by the separation of data packet transfer control and call connection control. The processing capacity of a packet switching system by the prior art, processing the transfers of data packets and the virtual call control of packets with the software of the same control unit, is limited by the capacity of the software. According to the present invention, the control of data packet transfers is separated from the processing of virtual call control. The processing of data packet transfers is accelerated by having hardware and firmware transfer packets by way of a specialized data packet communication path, and the processing of virtual call control is achieved only by the software of the processor by sending a call connection control packet to a control connection processor by way of another specialized communication path one for the call connection control packet.

Second, the present invention is characterized by the use of a first-in random-out (FIRO) memory control system for packet buffers. While in the conventional packet switching system the management of packet buffer memories is achieved by software in the present invention packet buffer memories are managed by hardware through a FIRO memory. The FIRO memory writes packets received from the line into a receive packet buffer memory sequentially (or consecutively), and sends out packets, when they are to be sent out on the specialized communication path for data packets, from any desired position in the received packet buffer. Conversely, when packets are to be received from the specialized communication path for data packets, they are sequentially written into the transmit packet buffer and, when they are to be sent out on the line, sent out as a rule in the sequence of their reception from the specialized communication path for data packets. When a retransmission is requested from the line, the packet is sent out on the line from any desired position, or when a signal or acknowledgment is received from the other party, the packet stored in the FIRO memory is dequeued.

Third, the present invention is characterized by its packet header rewriting means. The FIRO memory has, besides those for access from the line and the specialized communication path for data packets, a third access port, from which it is possible to either read out of or write into the packet buffer. By the use of this port, the contents of the packet header can be rewritten.

In order to materialize the foregoing characteristics, a packet switching system according to the present invention comprises a plurality of data line apparatuses, one for each data line, each data line apparatus further comprising a frame level processing circuit; receive packet storing means composed of a FIRO memory; transmit packet storing means composed of a FIRO memory; receive call connection control packet storing means composed of a first-in first-out (FIFO) memory for storing packets for the call connection control purpose out of the receive packets; transmit connection control packet storing means composed of an FIFO memory for storing transmit packets for the call connection control purpose; memory means for maintaining a call state for each logical channel number; and a data transfer controlling processor, wherein the data transfer controlling processor, of which one is provided in each of these data line apparatus, are connected by a packet buffer state information transfer bus, the receive packet storing means and transmit packet storing means are connected by a specialized data packet transfer bus, and the receive call connection control packet storing means, transmit connection control means and a separately provided connection controlling processor are connected by a specialized call connection control information transfer bus.

BRIEF DESCRIPTION OF THE DRAWINGS

In the drawings, the same reference numerals represent respectively the same structural elements.

BEST MODE FOR CARRYING OUT THE INVENTION

Figure 1:
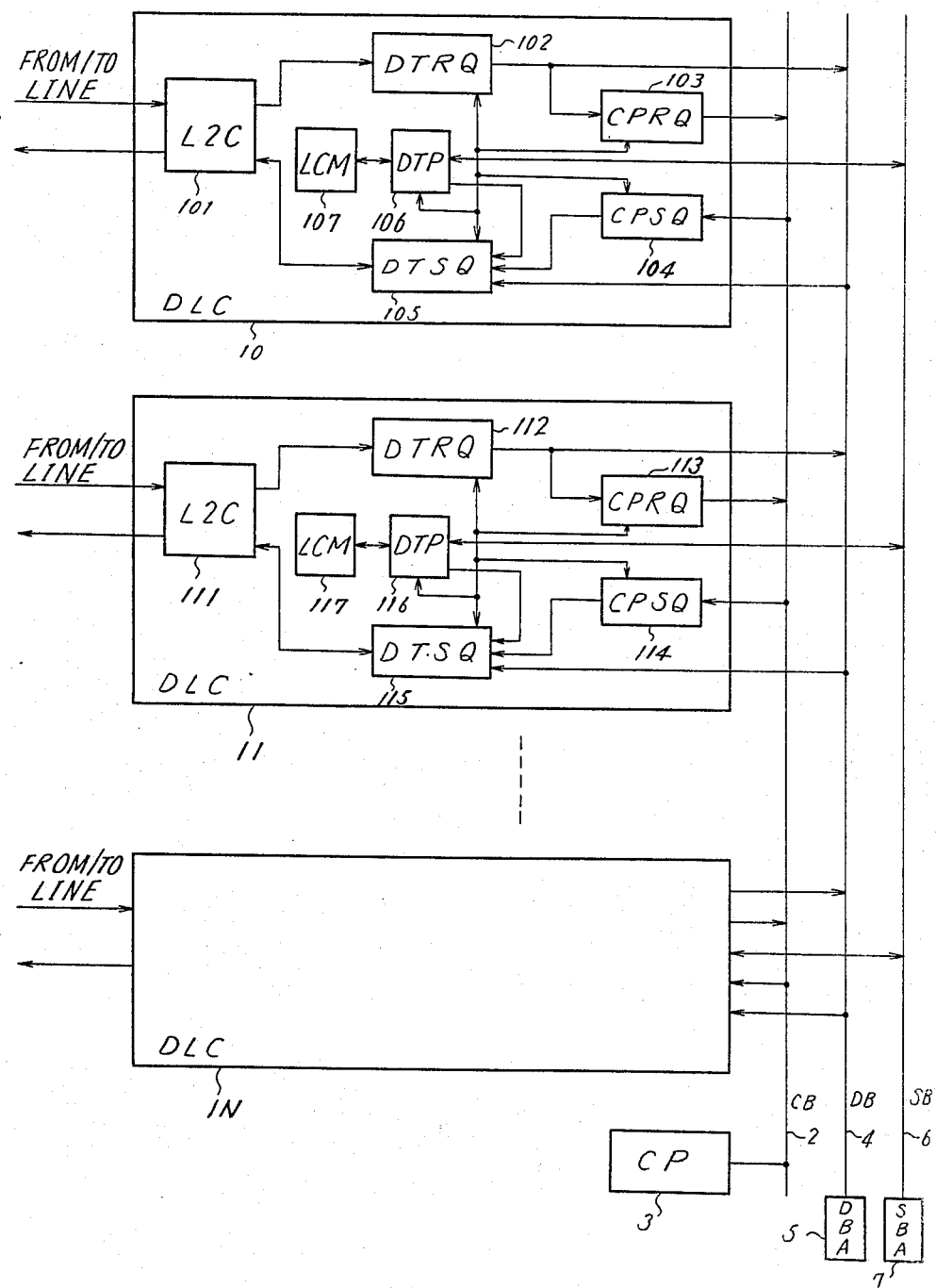
FIG. 1 is a block diagram of one preferred embodiment of the present invention.

Referring to FIG. 1, a preferred embodiment of the present invention is provided with a plurality of data line apparatuses (DLC's) 10, 11, . . . , and 1N, a specialized transfer bus for call connection control information (CB) 2 commonly connected to the DLC's 10, 11, . . . , and 1N, a call controlling processor (CP) 3 connected to the CB 2, a specialized data transfer bus for data packets (DB) 4 commonly connected to the DLC's 10, 11, . . . , and 1N, a data transfer bus controlling processor (DBA) 5 for controlling the use of the DB4, a packet buffer state information transfer bus (SB) 6, commonly connected to the DLC's 10, 11, . . . , and 1N, for transmitting and receiving call state information, and a call state transfer bus control apparatus (SBA) 7 for controlling the use of the SB6.

Since the DLC's 10, 11, . . . , and 1N are identically composed, the DLC 10 will be described below by way of example. The DLC 10 consists of a frame level processing circuit (L2C) 101, a receive packet storing circuit (DTRQ) 102 having an FIRO memory composition for storing receive packets from the L2C 101, a receive connection control packet storing circuit (CPRQ) 103 having an FIFO memory for storing call control connection packets stored in the DTRQ 102, a transmit connection control packet storing circuit (CPSQ) 104 having a FIFO memory for storing transmit connection control packets transferred via the CB 2, a transmit data packet storing circuit (DTSQ) 105 having an FIRO memory connected to the DB 4 and the CPSQ 104, a data transfer controlling processor (DTP) 106 connected to the SB 6 for controlling the circuits in the DLC 10, generating a receive ready (RR) packet and a receive not ready (RNR) packet as required, and sending them out to the DTSQ 105, and a call state memory (LCM) 107 connected to the DTP 106 for memorizing and maintaining the call state with a logical channel number as keyword.

Figure 2A:
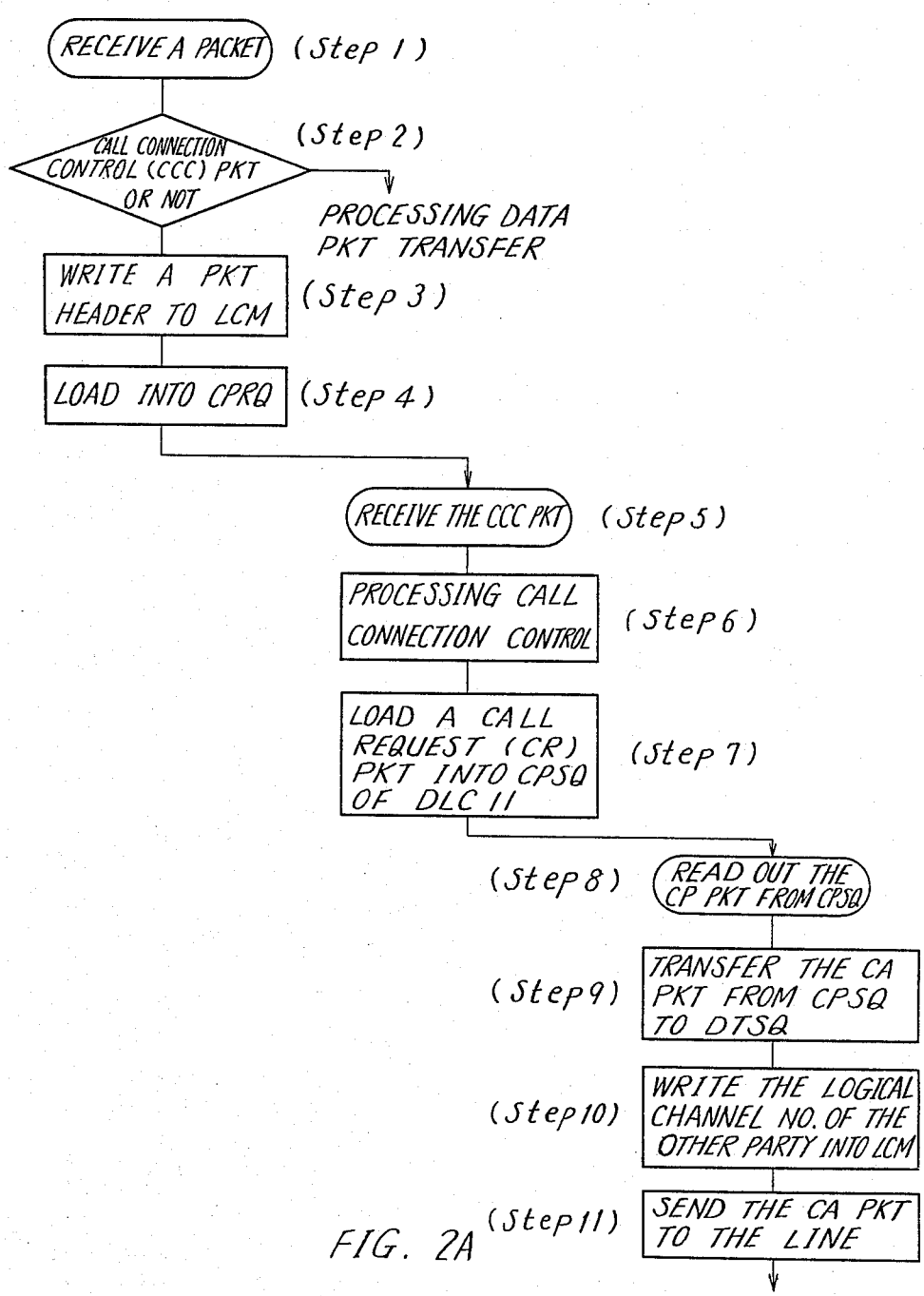
FIGS. 2A and 2B show flow charts of the flow of a call control packet.
Figure 2B:
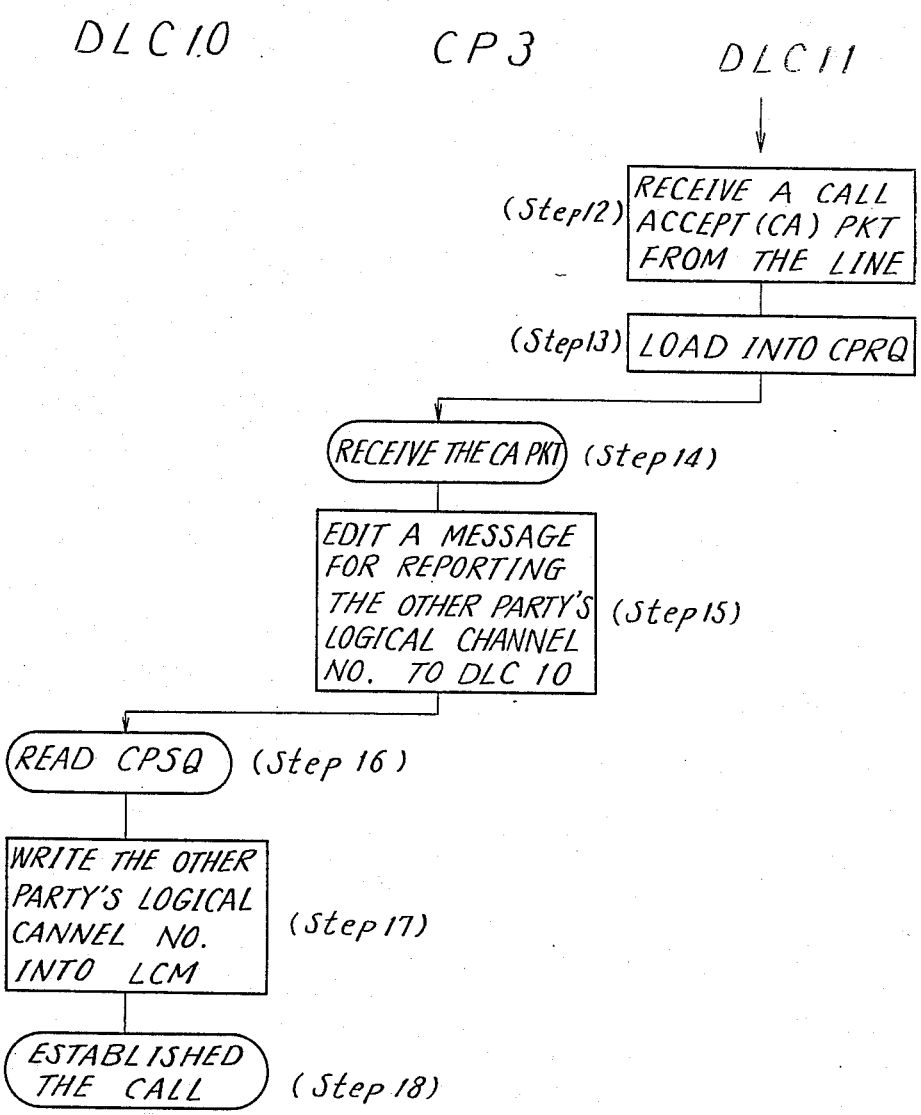

Next will be described the operation of this preferred embodiment with reference to FIGS. 1, 2A and 2B in combination. In the following description, out of plurality of DLC's 10, 11, . . . , and 1N, the DLC 10 will be supposed to be the calling party and the DLC 11, the called party.

Packets entered from a line into the L2C 101 of the DLC 10 are successively stored into the DTRQ 102 (Step 1). Every time a packet is stored, the DTP 106 is interrupted to read the basic information part of the packet, and judgment is made according to a packet type identifier as to whether it is a call connection control packet (Step 2). If it is a call connection control packet, the required part (the packet header, for instance) of the basic information is written into the applicable logical channel area of the LCM 107 (Step 3). The call connection control packet is loaded into the CPRQ 103, which is a queue circuit having the CP 3 as its only destination (Step 4). As soon as the CP 3 is vacated, the call connection control packet is transferred to the CP 3 via the CB 2 (Step 5). The CP 3 applies usual packet connection control processing to the entered call connection control packet (Step 6).

If, at this time, the call connection control packet is a call request (CR) packet, one of the logical channel numbers of the DLC 11 of the called party is selected out of a logical channel number table managed at the CP 3, and assigned to the packet. The call connection control packet sent out from the CP3 via the CB2 is loaded into the CPSQ 114 of the DLC 11 of the called party (Steps 7 and 8). The packet stored in the CPSQ 114 of the DLC 11 of the called party is transferred to the DTSQ 115 (Step 9). The DTP 116 monitors the basic information part of the packet loaded into the DTSQ 115, reads the logical channel number at this time, and writes required information (for instance the logical channel number of the other party) into the LCM 117 (Step 10), at the same time sending out the packet onto the line via the L2C 111 (Step 11). The DLC 11 of the called party waits for a call-accept (CA) packet from the other party's line and, if it receives a call-accept packet from the other party's line (Step 12), loads it into the CPRQ 113. It also informs the CP 3 of the reception of the call accept packet (Step 13). The CP 3, upon reception of the call accept packet from the DLC 11 (Step 14), edits a message for reporting the other party's logical channel number to the DLC 10 of the calling party, and loads the message into the CPSQ 104 of the DLC 10 of the calling party (Step 15). The DLC 10 reads the CPSQ 104 (Step 16) and writes the other party's logical channel number into the LCM 107 (Step 17), thereby generating a response to the logical channel in the LCM 107. By these steps is established a call (Step 18).

Figure 3:
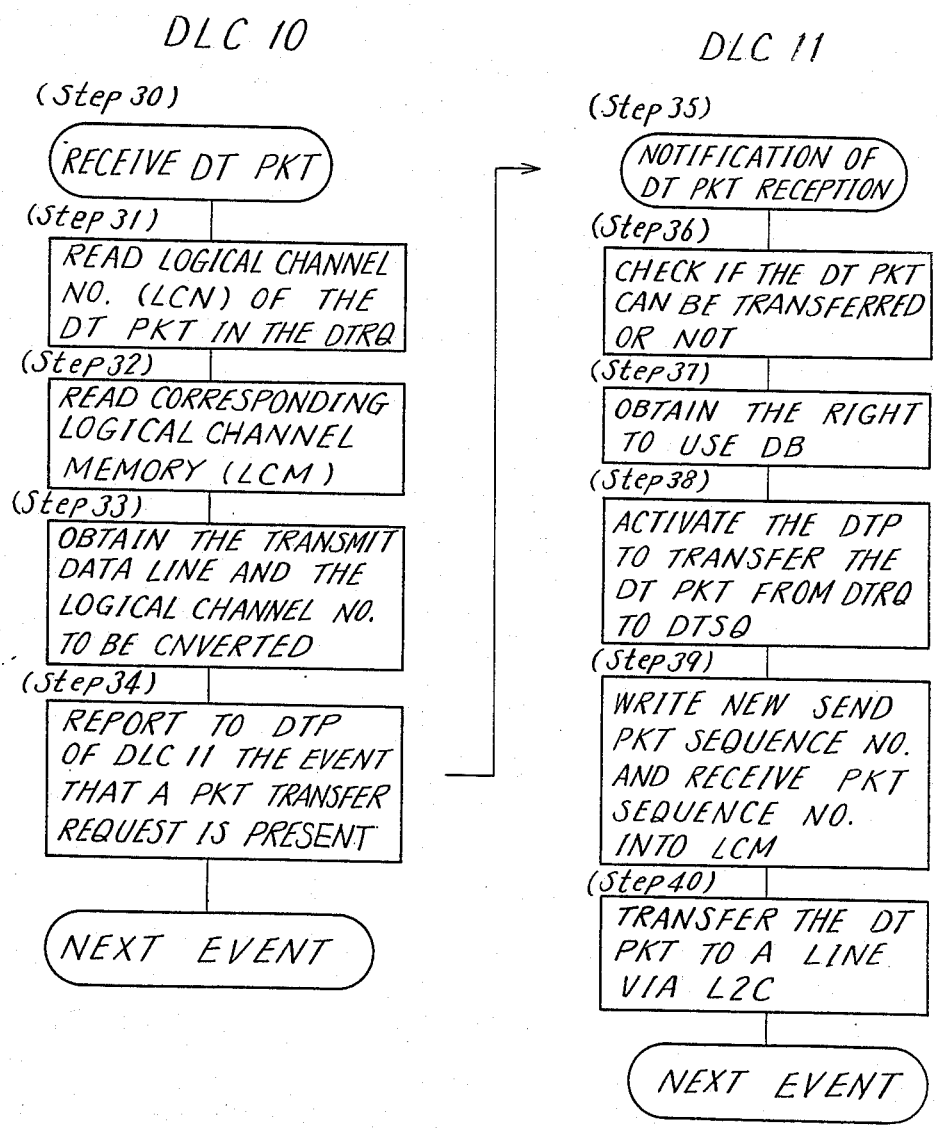
FIG. 3 is a flow chart for describing the flow of a data packet.

Next will be described the transfers of data packets stored in the DTRQ 102 or 112 with reference to FIGS. 1 and 3 together. Although either DLC can be the transmitting side or the receiving side after a call has been established, the DLC 10 will be supposed to be the receiving side, and the DLC 11 the transmitting side, in the following description.

As the DLC 10 on the receiving side receives a data packet from the line and stores it in the DTRQ 102 (Step 30), the DTP 106 reads out the data length and logical channel number from a basic information part of the data packet (Step 31). The DTP 106 refers to the LCM 107 (Step 32), and obtains the transmit data line and the logical channel number to be converted (Step 33). Then the DTP 106 reports to the DTP 116 of the DLC 11 on the transmitting side via the SB 6 only the event that a packet transfer request is present, together with a physical block number (to be explained in detail below) and the number of words to be transferred in the DTRQ 102 (Steps 34 and 35). The DTP 116 checks whether the DTSQ 115 is full. If the DTSQ 115 is full, the DTP 116 waits until the DTSQ 115 becomes not full (Step 36). If the DRSQ 115 is found not full, the DTP 116 immediately requests the DBA 5 for the right to use the DB 4 (Step 37). When the DBA 5 gives the right to use to the DTP 116 of the transmitting side, the DTP 116 provides the DTRQ 102 with the physical block number of the block to be transferred. The DTRQ 102 transfers data to the DTSQ 115 only by the prereported number of words based on the physical block number (Step 38).

What has to be noted here is that the direct actuator of the transfer via the DB 4 is the DTP 106 of the transferrer, not the DTP 116 of transmitting side. The DTP 116 writes a packet sequence number into the header part of the data packet stored in the DTSQ 115 (Step 39). The packets written and stored in the DTSQ 115 are read by the L2C 111 in the sequence of their storage (a sequential read mode), and sent out to the line (Step 40). When the L2C 111 receives a acknowledgement from a terminal or switching system of the other party, the L2C 111 sends out to the DTSQ 115 a dequeue signal and the acknowledged packets number. In response to this, the DTSQ 115 eliminates from the buffer and dequeues the designated number of packets from the top. If the L2C 111 receives a reject frame from the terminal or switching system of the other party and a retransmission of packets is made necessary, the L2C 111 designates the nth signal from the top of the DTSQ 115, and processes rereading of the pertinent packet data (a random read mode).

Next will be described in detail the transfer mechanism of the DB 4 and the composition and mechanism of the FIRO memory with reference to the DLC 10 as an example.

Figure 4:
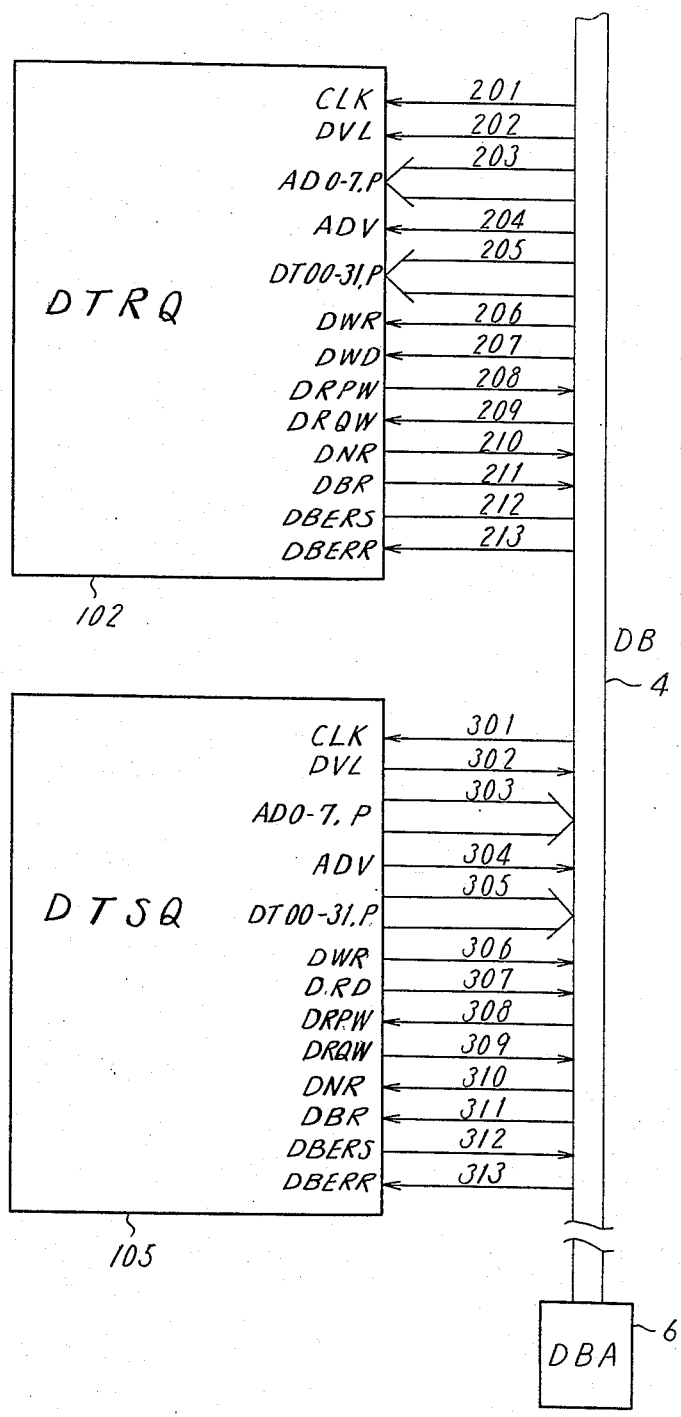
FIG. 4 is a block diagram illustrating the signal lines of a data bus.
Figure 5:
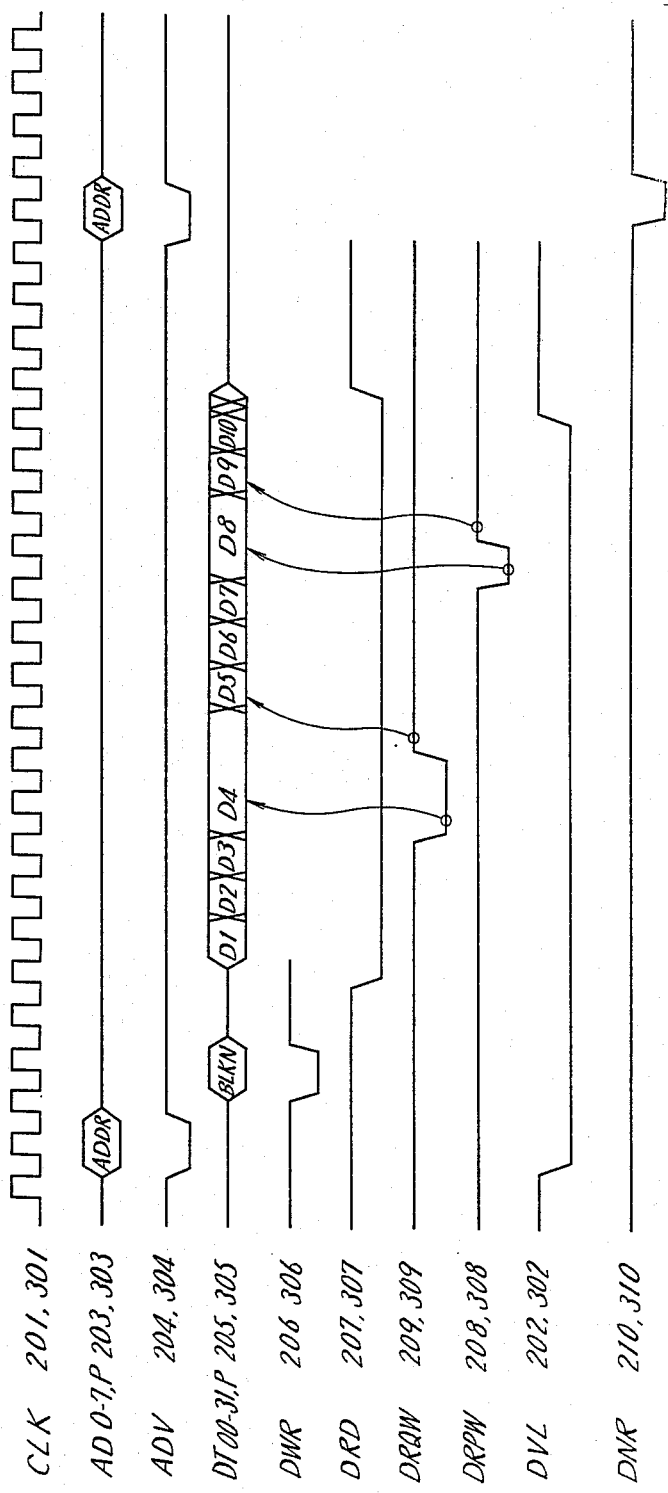
FIG. 5 is a timing chart of the signal lines of FIG. 4.

The signal lines on the DB 4 between the DTRQ 102 and the DTSQ 105 in FIG. 1 are shown in FIG. 4, and a timing chart of the signal lines shown in FIG. 4 is given in FIG. 5.

As shown in FIG. 4, the DTRQ 102 and the DTSQ 105 are connected through a bus by the signal lines to be described below. Reference numerals 201 and 301 represent clock signals (DLK) for the DTRQ 102 and the DTSQ 105. When the DTSQ 105 acquires the right to use the DB 4, the DTSQ 105 activates a data valid signal (DVL) 302, which is transmitted to every DTRQ on the DB 4. Referring to FIG. 4, a data valid receive signal (DVL) 202 having become active lets the DTRQ 102 know that one of the DTSQs on the DB 4 has acquired the right to use the bus and is going to actuate data transfer. The DTSQ 105 places the address of the DTRQ 102 on an address signal line (AD0-7) 303, and at the same time activates an address valid signal (ADV) 304. The DTRQ 102 monitors an address valid receive signal (ADV) 204, senses if an address receive signal (AD0-7) 203 coincides with its own address when said ADV 204 is active and, if it does, activates a data bus reply signal (DBR) 211. The DTSQ 105 senses a data bus reply receive signal (DBR) 311 and, if it finds this signal active, recognizes the operability of the DTRQ 102.

When the DTRQ 102 is busy, a data not ready signal (DNR) 210, instead of the data bus reply signal, is activated. The DTSQ 105, when it has detected the active state of a data not ready receive signal (DNR) 310, recognizes the inoperability of the DTRQ 102, and gives up the use of the bus.

Now if the DTSQ 105 has recognized the operability of the DTRQ 102, the DTSQ 105 places on a data signal line (DT00-31) 305 the physical number of the buffer block to be transferred by the DTRQ 102, and activates a write signal (DWR) 306. This is to inform the DTRQ 102 of the buffer block number. After the lapse of a certain length of time, the DTSQ 105 activates a read signal (DRD) 307. The DTSQ 105, upon confirming that the read receive signal (DRD) 307 is active, sequentially sends out to the DB 4 data from the designated physical block in the DTRQ 12 in synchronization with the leading edge of the clock signal 201. The DTRQ 102 takes in these data by a predetermined number of words in synchronization with the trailing edge of the clock signal 310.

If there arises a situation in which the DTRQ 102 is made temporarily unable to send out data to the DB 4, the DTRQ 102 activates a replier wait signal (DRPW)

208. The DTSQ 105, if a replier wait receive signal (DRPW) 308 is active, suspends the intake of data. Conversely, if there arises a situation in which the DTSQ 105 is made temporarily unable to take in data, the DTSQ 105 activates a requester wait signal (DRQW) 309. The DTRQ 105, if a requester wait signal (DRQW) 209 is active, suspends the updating of data sent out until the DRQW 209 becomes inactive. Parity bits P are added to address signal lines 203 and 303 and data signal lines 205 and 305. The DTRQ 102 or the DTSQ 105, having detected a parity error, sends a data bus error detection signal DBERS 212 or 312 to the bus. Upon recognition of this signal, the DTRQ 102 or the DTSQ 105 generates a data bus error receive signal DBERR 213 or 313, and suspends data transfer by inactivating a DVL 302 or a DBR 211.

Next will be described the FIRO memory constituting the DTRQ 102 or the DTSQ 105 with reference to FIG. 6, which illustrates the detailed interfaces of a FIRO memory 60 having a FIRO controller (FIROC) 61 and a RAM 62 also illustrated are the L2C 111, the DB 4 and the DTP 106 consisting of a microprocessor. The bus interface between the FIRO memory 60 and the DB 4 was already described with reference to FIG. 4. The RAM 62 is used as a packet transmission/reception buffer, and is interfaced with the FIROC 61 by the signal lines of an address signal (AD0-19) 621 for the RAM 62, a data signal (D0-31) 622, a write-in instruction signal (WR) 623 and a read out instruction signal (DR) 624. The L2C 111 is interfaced with the FIROC 61 by a signal (CRQ) 641 demanding the L2C 111 to read data from the FIROC 61, a signal (CAK) 642 indicating the reception of said CRQ 641 by the L2C 111, a chip select signal (LCS) 643 indicating access from the L2C 111 to the FIROC 61, an I/O address signal (LAD1-12) 644 to the FIRO 61, a data signal (LD0-15) 645, a write-in instruction signal (LWR) 646, a read-out instruction signal (LRD) 647, a wait signal line (LWT) 648, an enqueue instruction signal (ENQ) 649, an input data cancel signal (CAN) 650 and a dequeue instruction signal (DEQ) 651. The DTP 106 is interfaced with the FIROC 61 by a data signal line (PD0-15) 631, an address signal line (PA0-19) 632, a write-in instruction signal (PWR) 633, a read-out instruction signal (PRD) 634, a wait signal line (PWT) 635, an interruption signal (INT) 636, and a chip select signal line (PCS) 634.

Figure 7:
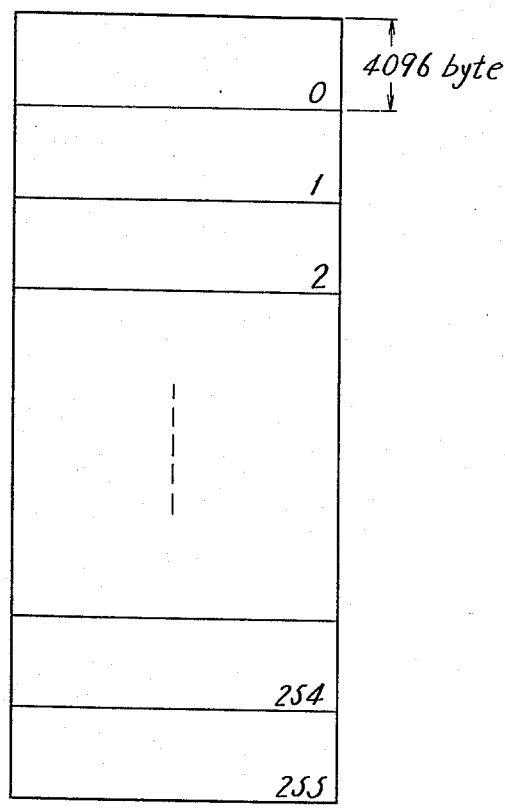
FIG. 7 is a memory map of a random access memory (RAM) constructing the FIRO memory.

The address space of the RAM 62, as shown in FIG. 7, consists of 256 blocks of 4,096 bytes each. These blocks are numbered from 0 to 255, and these numbers are referred to as physical block numbers.

Now will be described, with reference to FIG. 8, the internal structure of the FIROC 61 illustrated in FIG. 6. The FIROC 62 is provided with a level 2 interface (L2INF) 6101, a microprocessor interface (μPINF) 6102, a bus interface (BINF) 6103, a data selector (DSEL) 6104 for the RAM 62, an address selector (ASEL) 6105 for the RAM 62, an arbiter circuit (ARB) 6106 for contention among read out or write in signals from the L2INF 6101, μPINF 6102 and BINF 6103 to the RAM 62, a block number first-in first-out memory (BNFIFO) 6107 for storing unused physical block numbers on a first-in first-out basis, an LREGW 6108 for reading unoccupied physical block numbers from this BNFIFO 6107 and temporarily memorizing them for use as upper addresses for writing in from the L2INF 6101, an LREGR 6109 for the use of read addresses, a counter LCNT 6110 for generating lower addresses for writing in from the L2INF 6101, an LSEL 6111 for selecting the outputs of the LREGW 6108 and LREGR 6109, an adder (LADD) 6112 for generating an address for the RAM 62 from the outputs of this LSEL 6111 and the LCNT 6110 in compliance with a write request from the L2INF 6101, a BREGW 6113 for reading unoccupied physical block numbers from the BNFIFO 6107 and temporarily memorizing them for use as upper addresses for writing in from the DB 4, a BREGR 6114 written in from the bus interface for the use of upper addresses for reading into the DB 4, a BSEL 6115 for selecting the outputs of the BREGW 6113 and BREGR 6114, a counter BCNT 6116 for generating lower addresses for the RAM 62 for writing into and reading out of the bus, and an adder (BADD) 6117 for generating an address for the RAM 62 from the count of the BCNT 6116 and the output of the BSEL 6115 in compliance with an access from the DB 4.

After initialization, all the physical numbers of the RAM 62 are stored in the BNFIFO 6107 without duplication. The BCNT 6116 and the LCNT 6110 are set at zero. A physical block number is immediately read out of the BNFIFO 6107 and set in the LREGW 6108 and the BREGW 6113. Upon reception of data from the line, the L2C 111 issues to the L2INF 6101 the write signal (LWR) 646 for the FIRO memory. Every time the LWR 646 is entered, the L2INF 6101 outputs an LCNT advance signal to update the LCNT 6110. An address for the RAM 62 is generated from the LREGW 6108, LCNT 6110 and LADD 6112, and input data from the line are stored in the RAM 62. As the ENQ signal 649 is entered into the L2INF after the storage of the input data, the LCNT 6110 is cleared to zero, and the next vacant block number is read out of the BNFIFO 6107 and set in the LREGW 6108 to prepare for reception of the next data. The L2INF 6101 reports the completion of reception to the μPINF 6102 by the REP 655. In response to this, the μPINF 6102 issues the INT 636 to the DTP 106 to report the reception of the data. If the CAM 650 is entered, the LREGW 6108 is not updated, but only the LCNT 6110 is cleared. The physical block written in is thereby invalidated.

When there is a data transfer request from the DB 4 side, the number of the physical block to be transferred is written into the BREGR 6114 by the BINF 6103. As a read signal from the BINF 6103 to the RAM 62 is generated, every time a read out signal is outputted from the BINF 6103, the BCNT 6116 is updated, and a read address for the RAM 62 is generated by the BREGR 6114, BCNT 6116, BSEL 6115 and BADD 6117, so that the data in the RAM 62 are read out to the DB 4 via the BINF 6103. Upon normal completion of the transfer, the BINF 6103 clears the BCNT 6116, and reports the number of the transferred block to the μPINF 6102 by way of a report line (REP) 661. In response to this signal, the μPINF 6102 reports to the DTP 106 by the INT 636. The BINF 6103 registers in the BNFIFO 6107 again the number of the transferred block as a vacant block number. If the transfer fails to be completed normally, the BINF 6103 clears the BCNT 6116, and reports the occurrence of the error to the DTP 106 via the REP 661 and the μPINF 6102.

Now, when a data write in request is received from the DB 4 side, every time a write in signal is outputted from the BINF 6103, the BCNT 6116 is updated, a write in address for the RAM 62 is generated by the BCNT 6116, BREGW 6113, BSEL 6115 and BADD 6117, and data from the DB 4 are written into the RAM 62 via the BINF 6103. Upon normal completion of the transfer, the BINF 6103 clears the BCNT 6116, and the next vacant block number is read out of the BNFIFO 6107 and set in the BREGW 6113 in preparation for the next round of data reception from the DB 4. The BINF 6103 reports the completion of data reception from the DB 4 to the μPINF 6102 by way of the REP 655. In response to this, the μPINF 6102 issues the INT 636 to the DTP 106 to report the reception of the data from the DB 4. If the transfer ends abnormally, the BREGW 6113 is not updated, but only the BCNT 6116 is cleared, and the physical block just written in is thereby invalidated.

Next, when data are to be sent out to the line, the number of the physical block to be transferred is written, before the start of the transfer, into the LREGR 6109 by the L2INF 6101. As a read signal from the L2INF 6101 to the RAM 62 is generated, every time a read out signal is outputted from the L2INF 6101, the LCNT 6110 is updated, and a read address for the RAM 62 is generated by the LCNT 6110, LREGR 6109, LSEL 6111 and LADD 6112, so that the data in the RAM 62 are outputted to the L2C 111 via the L2INF 6101 and then to the line.

Figure 9:
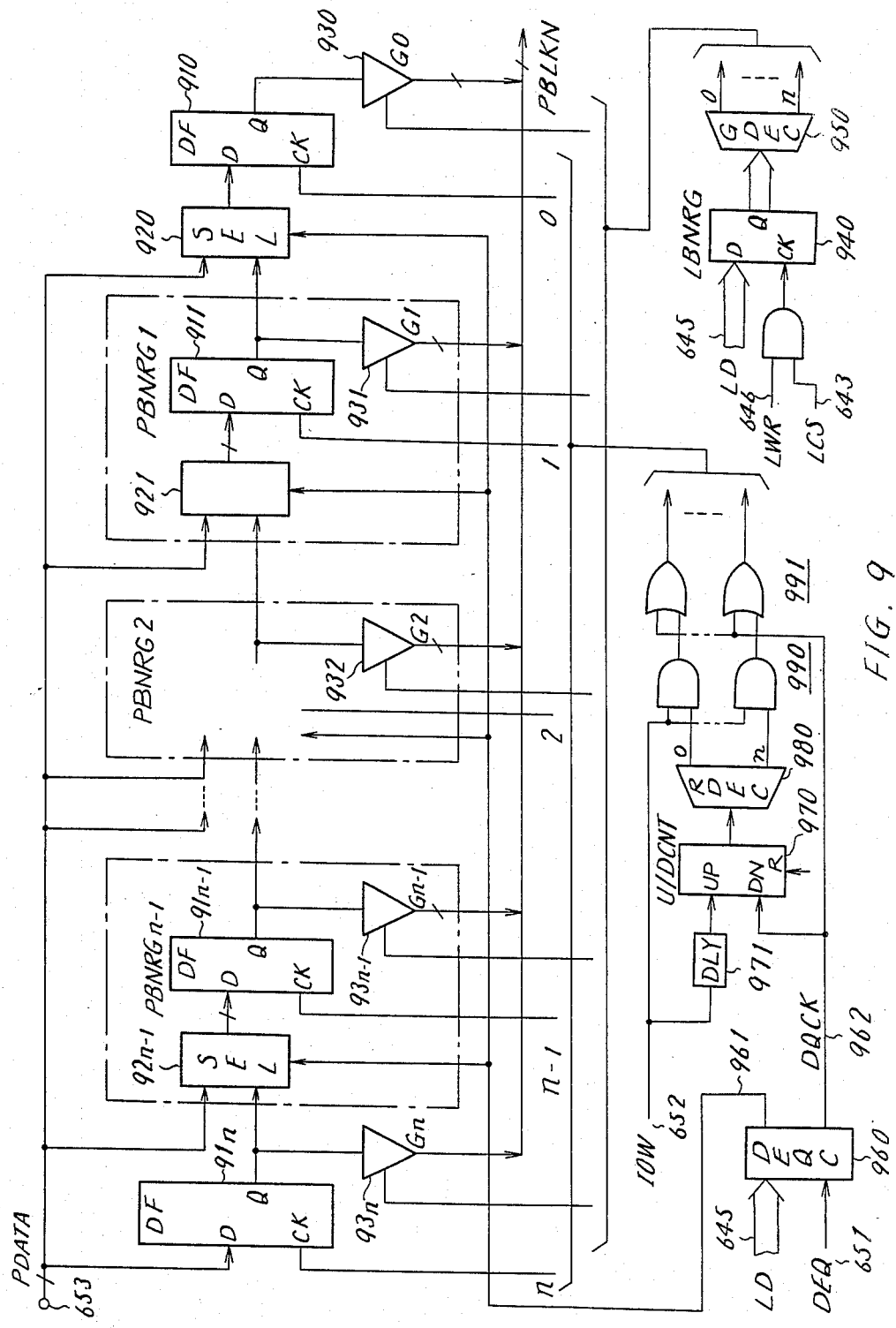
FIG. 9 is a block diagram of a mechanism for conversion between physical block numbers and logical block numbers within the FIROC.

The L2INF 6101 is provided with a mechanism, as illustrated in FIG. 9, for conversion between logical and physical block numbers, and there is realized a conversion dequeue mechanism for physical and logical block numbers.

Figure 6:
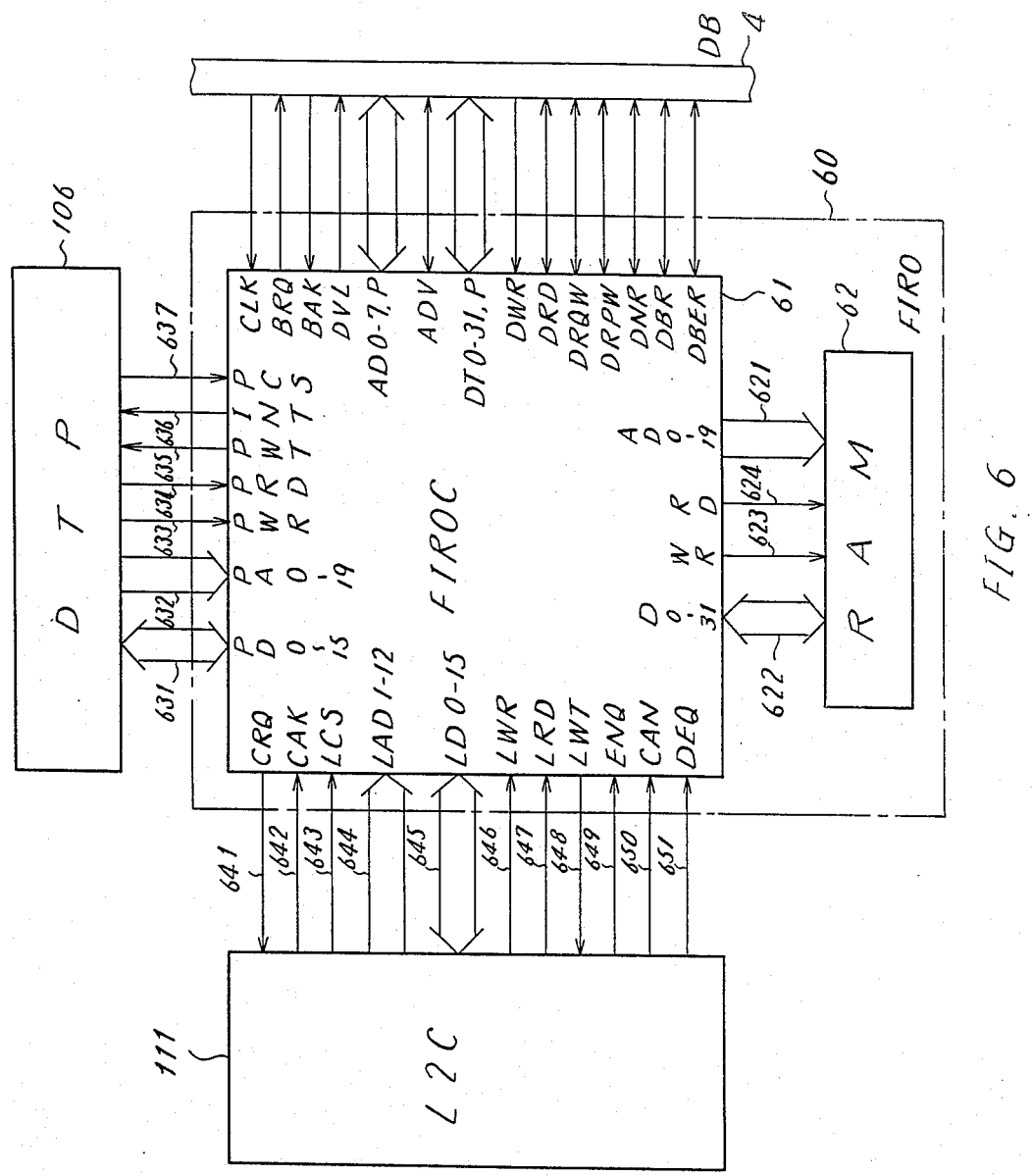
FIG. 6 is a block diagram of the overall structure of a FIRO memory.
Figure 8:
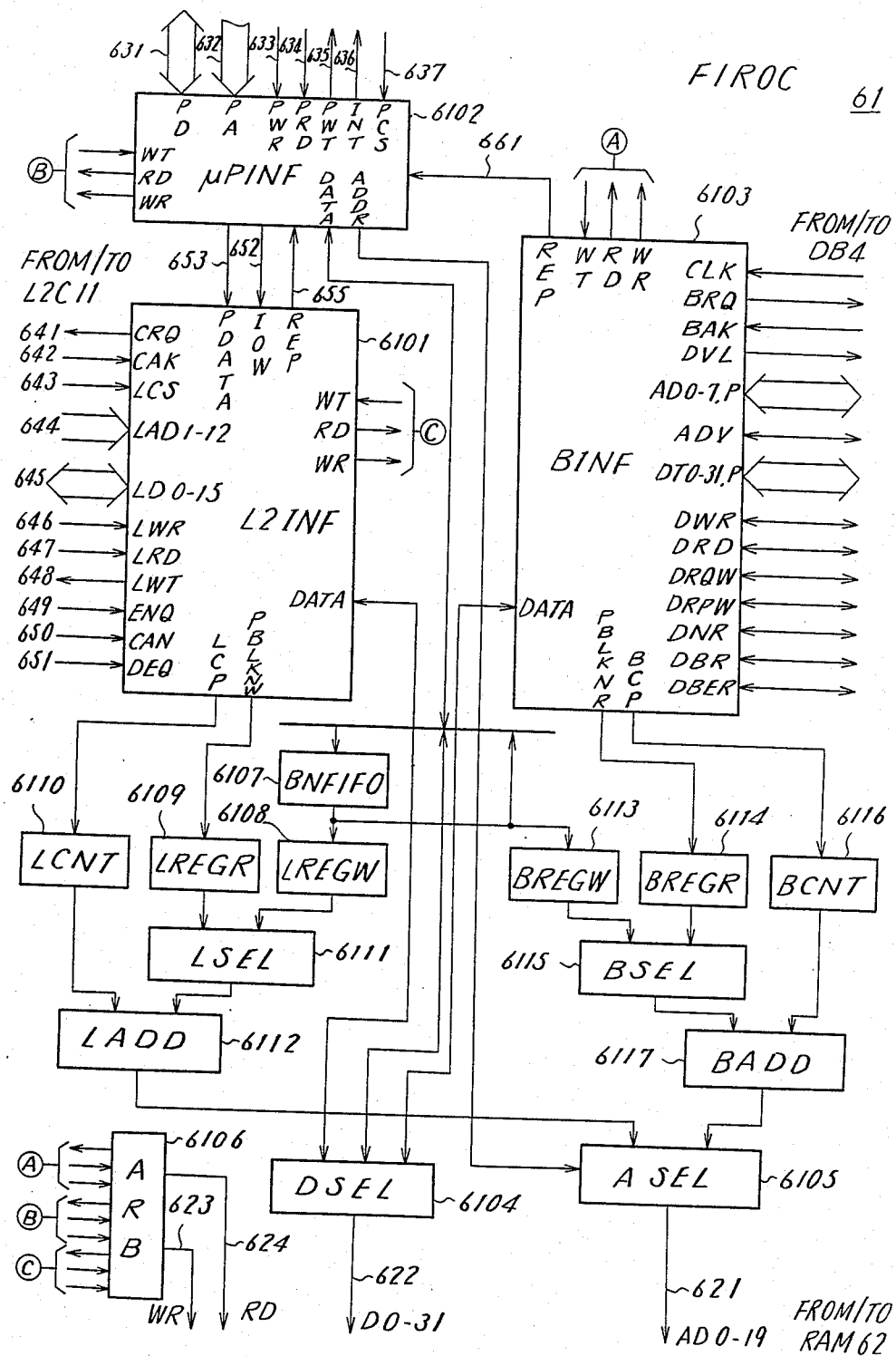
FIG. 8 is a block diagram showing the internal structure of an FIRO controller (FIROC)

The following description will refer primarily to FIG. 9 and additionally to FIGS. 6 and 8. Referring to FIG. 9, the physical/logical block number conversion mechanism of the L2INF 6101 is composed of n+1 physical block holding registers (PBNRG0 to PBNRGn) 910 to 91n, n selectors (SEL0 to SELn-1) 920 to 92n-1, one each positioned on the input side of the PBNRGi, n+1 tristate gates (G0 to Gn), one each on the output side of the PBNRGi, a logical block number holding register (LBNRG) 9401, a gate decoder (GDEC) 950 on its output side, a dequeue controller (DEQC) 960 to perform dequeue control, an up-down counter (U/D CNT) 970, a register-decoder (RDEC) 980 on the output side of the U/D CNT 970, and n+1 2-input AND elements 990 on the output side of the RDEC 980.

After initialization, the count of the U/D CNT 870 is cleared to zero. Packets are received by the FIROC 61 from the DB 4 side and stored in the RAM 62 of the FIRO 60, and their storage is reported to the DTP 106 connected to the FIRO 60 via the μPINF 6102. The DTP 106 outputs on its own data bus the number of the physical block in which are stored the packets that have been sent out on the line, and supplies an IO write signal (IOW) 652. A data bus signal (PDATA) 653 is fed via the PINF 6102 to one of the inputs of every one of the SELs 920 to 92n-1 and the input of the PBNRGn in FIG. 9. At this time, the output of the U/D CNT 970 is decoded by the RDEC 980, and one of the AND gates 990 is activated according to the count of the U/D CNT 970 then, so that an IOW signal 652 is supplied to one of the clock inputs of the PBNRGi. Further the SELs 920 to 92n-1 so function as to output all the inputs from the data bus, and the physical block number is stored in the PBNRGi. After the lapse of a certain length time, the U/D CNT 970 is advanced by way of a delayer (DLY) 971. Thus are established correspondence between the physical block number and a logical block number i. At this time, i is a number that indicates the ith position (counted from the 0th) from the top of the packet to be sent out to the line via the L2C 111.

Simultaneously with the writing of the physical block number into the PBNRGi, the IOW signal 652 is sent to the L2C 111 as a command request signal (CRQ) 641. By counting the number of times the CRQ signal 641 is inputted, the L2C 111 can know how many blocks of packets from the top in the FIRO memory 60 are required to be sent out. Since the L2C 111 usually sends out the top packet in the FIRO memory 60, when it is to send the jth packet from the top in the FIRO memory 60, the number j is added to an LD 645, and an LWR 646 and LCS 643 are supplied to write the number j into the LBNRG 940. By this procedure, the GDEC 950 opens only one, Gj, out of the gates G0 930 to Gn 93n, and the corresponding physical block number written in the PBNRGj is outputted to a PBLK output signal line (PBLKN) 654. By latching this value to the LREGR 6109 of FIG. 8, the jth packet from the top in the FIRO memory 60 can be read out to the L2C 111.

When the L2C 111 has sent out a packet to the line and received acknowledgment, it has to erase that packet from the FIRO memory 60, and this procedure is called dequeuing. Usually, upon receiving acknowledgment, the L2C 111 is required to dequeue at a time k packets from the top of the FIRO memory 60. When dequeuing, the L2C 111 adds the value of k to the LD 645, and supplies a dequeue signal (DEQ) to the DEQC 960, whose output is then inputted to every one of the SELs 920 to 92n-1 to so perform control that the input to the PBNRGi from the SELi be outputted, and k pulses are supplied to the output clock (DQCK) 962 of the DEQC 960. Then the U/D CNT 970 counts down by k, and the DQCK 962 is fed k times to every one of the PBNRG's 910 to 9ln by way of an OR gate 991, so that, when k DQCKs 962 have been fed, the PBNRG0 910 will have the value so far held by the PBNRGk, and similarly the PBNRGi will have the value previously held by the PBNRGk+i and so forth. Thus k packets from the top will be dequeued. The fact that k packets have been dequeued is reported to the DTP 106 via the μPIUF 6102. The DTP 106 thereby recognizes the vacancy of k physical blocks, and writes the numbers of the k vacant blocks into the BNFIFO 6107 via the PINF 6102.

We claim:

1. A packet switching system including an apparatus and method for packet switching, the system comprising:

a plurality of data line apparatus, each having receive packet storing means provided with a first-in random-out (FIRO) memory for storing a plurality of receive packets from a single data line, receive call connection control packet storing means for storing call connection control packets out of said receive packets, transmit connection control packet storing means for storing transmit call connection control packets, transmit packet storing means provided with a FIRO memory for storing a plurality of packets to be sent out to said data line, memory means for maintaining a call state for each of a plurality of logical channel numbers, and a data transfer control processor for controlling all the foregoing means;

a call controlling processor provided for common use by said plurality of data line apparatus;

packet buffer state information transfer bus means for connecting said data transfer control processors of said plurality of data communication line apparatus;

data packet transfer bus means for commonly connecting said receive packet storing means and said transmit packet storing means of said plurality of data line apparatus; and call connection control information transfer bus means for connecting said receive connection control packet storing means and said transmit connection control packet storing means of said plurality of data line apparatus and said call connection control processor;

sending data transfer request control information including a number of data bytes and a block address from a first data line apparatus to a second data line apparatus by way of said packet buffer state information transfer bus means when data is to be transferred from a second receive packet storing means of the second data line apparatus to a first transmit packet storing means of the first data line apparatus over said data packet transfer bus means, authorizing the second data line apparatus to use the data packet transfer bus means upon receiving the data transfer request control information if the first transmit packet storing means has available space for the data, and transferring data corresponding to the number of data bytes from the physical block address reported from the second receive packet storing means by the data transfer request control information to the first transmit packet storing means from the second receive packet storing means.

2. A packet switching system as claimed in claim 1 wherein each data line apparatus further includes a data transfer controlling processor connected to communicate over the packet buffer state information transfer bus means.

3. A packet switching system as claimed in claim 2 wherein each receive packet storing means includes a level two interface, a mircoprocessor interface connected to communicate with the data transfer controlling processor, and a bus interface connected to the data packet transfer bus means, and each transmit packet storing means includes a level two interface, a microprocessor interface connected to communicate with the data transfer controlling processor, and a bus interface connected to communicate over the data packet transfer bus means.

* * * * *